(12) United States Patent
Dance

(10) Patent No.: US 7,836,397 B2
(45) Date of Patent: Nov. 16, 2010

(54) AUTOMATIC LAYOUT CRITERION SELECTION

(75) Inventor: Christopher R. Dance, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1325 days.

(21) Appl. No.: 11/344,729

(22) Filed: Feb. 1, 2006

(65) Prior Publication Data
US 2007/0180363 A1   Aug. 2, 2007

(51) Int. Cl.
G06F 17/00   (2006.01)
(52) U.S. Cl. .......................... 715/243; 715/253
(58) Field of Classification Search .............. 715/243, 715/244, 245, 246, 247, 253, 273
See application file for complete search history.

(56) References Cited

U.S. PATENT DOCUMENTS

| | | | |
|---|---|---|---|
| 5,182,793 A * | 1/1993 | Alexander et al. | 706/13 |
| 5,649,068 A | 7/1997 | Boser et al. | |
| 6,327,581 B1 | 12/2001 | Platt | |
| 7,062,466 B2 * | 6/2006 | Wagner et al. | 705/51 |
| 7,451,140 B2 | 11/2008 | Purvis et al. | |
| 2004/0019851 A1 * | 1/2004 | Purvis et al. | 715/517 |
| 2004/0205643 A1 | 10/2004 | Harrington | |
| 2005/0028074 A1 | 2/2005 | Harrington et al. | |
| 2005/0028075 A1 | 2/2005 | Harrington et al. | |
| 2005/0028076 A1 | 2/2005 | Harrington et al. | |
| 2005/0028096 A1 | 2/2005 | Harrington et al. | |
| 2005/0028097 A1 | 2/2005 | Harrington et al. | |
| 2005/0028098 A1 | 2/2005 | Harrington et al. | |
| 2005/0028099 A1 | 2/2005 | Harrington et al. | |
| 2005/0071755 A1 * | 3/2005 | Harrington et al. | 715/511 |
| 2005/0154980 A1 | 7/2005 | Purvis et al. | |

OTHER PUBLICATIONS

Cristianini et al., "The Learning Methodology," *An Introduction to Support Vector Machines and Other Kernel-based Learning Methods*, pp. 1-51, Cambridge Univ. Press (2000).

Goutte et al., "Combining labelled and unlabelled data: a case study on . . . ," Proc. of CoNLL-2002, 7 pp.

Cristianini et al., "On Kernel Target Alignment," Journal of Machine Learning Research 1, pp. 1-31, (2002).

Muller et al., "An Introduction to Kernel-Based Learning Algorithms," IEEE Transactions on Neural Networks, vol. 12 No. 2, pp. 181-2001, Mar. 2001.

(Continued)

*Primary Examiner*—Laurie Ries
(74) *Attorney, Agent, or Firm*—Fay Sharpe LLP

(57) ABSTRACT

A document publishing system includes a layout quality tagger (40) for tagging candidate layouts (36) of selected content (32) with overall layout quality criterion values using an overall layout quality criterion (16, 18) combining a set of component quality criteria as a weighted linear combination of kernels. Each kernel corresponds to an inner product comparing component quality criteria values of a training layout with corresponding component quality criteria an input layout. A trainer (14) trains the overall layout quality criterion using the training layouts (12). A layout selector (42) validates a layout for the selected content (32) based at least on the tagged overall layout quality criterion value of the layout. A publisher (50, 52, 54) publishes the validated layout (44) including the selected content (32).

16 Claims, 2 Drawing Sheets

OTHER PUBLICATIONS

Reich, AI in Engineering, 8(2):141-153, pp. 15-27, 1993.

Demiriz et al., "Linear Programming Boosting via Column Generation," Machine Learning, 46, pp. 225-254, Kluwer Academic Publishers. Manufactured in The Netherlands, 2002.

Shashua et al., "Taxonomy of Large Margin Principle for Ordinal Regression Problems," Technical Report, 2002—No. 39, Leibniz Center for Research, School of Computer Science and Eng., the Hebrew University of Jerusalem, (2002).

Vert et al., "A primer on kernel methods," in Kernel Methods in Computational Biology, MIT Press, Cambridge, MA, US, pp. 1-42 (preprint), Aug. 2004.

* cited by examiner

AUTOMATIC LAYOUT CRITERION SELECTION

BACKGROUND

The following relates to the document layout art. It finds application in automatic and semi-automatic document layout systems, in methods of selecting a document layout for selected content, in proofing document layouts, in automatic and semi-automatic document proofing systems, in document publication systems, and in other like applications.

A common component of publishing tasks such as printing, website maintenance, email solicitation, and other types of publication is the development of a suitable layout for publishing the selected content. In publishing, selected content such as text, images, figures, tables, equations, logos, or so forth is to be arranged on a printed page, a webpage, the body of an email solicitation, or so forth. Content layout can be specified in various ways, including automatically or semi-automatically through the use of a layout template, by intervention of a graphic artist, by automatically, semi-automatically, or manually specifying low-level layout parameters such as font size, font type, image characteristic, or so forth. Depending upon the workflow configuration, the person generating the content may have limited control over the layout of the final published document.

There are typically a large number of possible layouts for a given content. The quality of each layout can be assessed in many different ways, suitably set forth as component layout quality criteria, such as color harmony, alignment, balance, uniformity, contrast, navigability, cost, amount of white space, or it might be more directly computed from lower-level properties, such as positions of bounding boxes of page zones, absolute color values, font sizes, or so forth. The number of component quality criteria can be large, for example as high as dozens or even hundreds of different component quality criteria. Moreover, various component criteria are interrelated, so that trade-offs are involved in selecting a layout. For example, using a larger font size may be desirable from a readability standpoint, but the larger font size may adversely affect the amount of white space, or may result in a longer layout (that is, more pages), or may adversely affect other component quality criteria.

In high-capacity publishing, the time that can be allotted for layout selection is limited, and the person selecting the layout may be different from the person who generated the content to be published. Accordingly, it is desirable to have a mechanism for assessing the quality of a candidate layout in an automated or semi-automated fashion, so as to facilitate layout selection from amongst a plurality of candidate layouts. However, the overall quality of a layout is a subjective measure that is usually determined by a human evaluator, and is not readily amenable to automated or semi-automated determination. Furthermore, there may be stylistic issues related to document genre or brand image that imply a need for different overall quality measures.

CROSS REFERENCE TO RELATED PATENTS AND APPLICATIONS

The following U.S. patent applications, relating generally at least to aspects of document proofing and/or measuring and quantifying document quality, and are incorporated herein by reference:

Purvis et al., "System and Method for Proofing Individual Documents of Variable Information Document Runs using Document Quality Measurements," U.S. patent application Ser. No. 11/032,746 filed 11 Jan. 2005, is incorporated by reference herein in its entirety.

Purvis et al., "System and Method for Dynamic Document Layout," U.S. patent application Ser. No. 10/757,688 filed 14 Jan. 2004 and published as US 2005/0154980 on 14 Jul. 2005, is incorporated by reference herein in its entirety.

Harrington et al., "System and Method for Measuring and Quantizing Document Quality," U.S. patent application Ser. No. 10/880,841 filed 30 Jun. 2004 and published as US 2005/0028097 on 3 Feb. 2005, is incorporated by reference herein in its entirety.

Harrington et al., "System and Method for Measuring and Quantizing Document Quality," U.S. patent application Ser. No. 10/881,792 filed 30 Jun. 2004 and published as US 2005/0028076 on 3 Feb. 2005, is incorporated by reference herein in its entirety.

Harrington et al., "System and Method for Measuring and Quantizing Document Quality," U.S. patent application Ser. No. 10/881,157 filed 30 Jun. 2004 and published as US 2005/0028075 on 3 Feb. 2005, is incorporated by reference herein in its entirety.

Harrington et al., "System and Method for Measuring and Quantizing Document Quality," U.S. patent application Ser. No. 10/880,688 filed 30 Jun. 2004 and published as US 2005/0028074 on 3 Feb. 2005, is incorporated by reference herein in its entirety.

Harrington et al., "System and Method for Measuring and Quantizing Document Quality," U.S. patent application Ser. No. 10/881,188 filed 30 Jun. 2004 and published as US 2005/0028099 on 3 Feb. 2005, is incorporated by reference herein in its entirety.

Harrington et al., "System and Method for Measuring and Quantizing Document Quality," U.S. patent application Ser. No. 10/881,134 filed 30 Jun. 2004 and published as US 2005/0028098 on 3 Feb. 2005, is incorporated by reference herein in its entirety.

Harrington et al., "System and Method for Measuring and Quantizing Document Quality," U.S. patent application Ser. No. 10/880,840 filed 30 Jun. 2004 and published as US 2005/0028096 on 3 Feb. 2005, is incorporated by reference herein in its entirety.

The following U.S. patent application: Harrington, "Reproduction of Documents using Intent Information," U.S. patent application Ser. No. 09/733,385 filed 4 Dec. 2000 and published as US 2004/0205643 on 14 Oct. 2004, relating generally at least to aspects of determining a document intent vector capturing high-level intent information, is incorporated by reference herein in its entirety.

BRIEF DESCRIPTION

According to certain aspects illustrated herein, a document layout system is disclosed. A candidate layout generator constructs a plurality of candidate layouts for selected content. A layout quality tagger tags the candidate layouts with overall layout quality criterion values using an overall layout quality criterion combining a set of component quality criteria as a weighted linear combination of kernels. Each kernel corresponds to an inner product comparing component quality criteria values of a training layout with corresponding component quality criteria values of an input layout. A layout selector selects a layout for the selected content from amongst the candidate layouts based on the tagged overall layout quality criterion values.

According to certain aspects illustrated herein, a document publishing system is disclosed. A layout quality tagger is provided for tagging candidate layouts of selected content with overall layout quality criterion values using an overall layout quality criterion combining a set of component quality criteria as a weighted linear combination of kernels. Each kernel corresponds to an inner product comparing component quality criteria values of a training layout with corresponding component quality criteria values of an input layout. A layout selector validates a layout for the selected content based at least on the tagged overall layout quality criterion value of the layout. A publisher is provided for publishing the validated layout including the selected content.

According to certain aspects illustrated herein, a document layout system is disclosed. A candidate layout generator constructs one or more candidate layouts for selected content. A layout quality tagger tags the candidate layouts with overall layout quality criterion values computed using a weighted overall layout quality criterion combining a set of component quality criteria. A trainer adjusts weights of the overall layout quality criterion respective to a set of labeled training layouts such that the layout quality tagger is configured to tag the labeled training layouts with overall layout quality criterion values substantially corresponding to the labels of the labeled training layouts. A layout selector selects a layout for the selected content from amongst the one or more candidate layouts based on the corresponding tagged overall layout quality criterion values.

DETAILED DESCRIPTION

Figure 1:
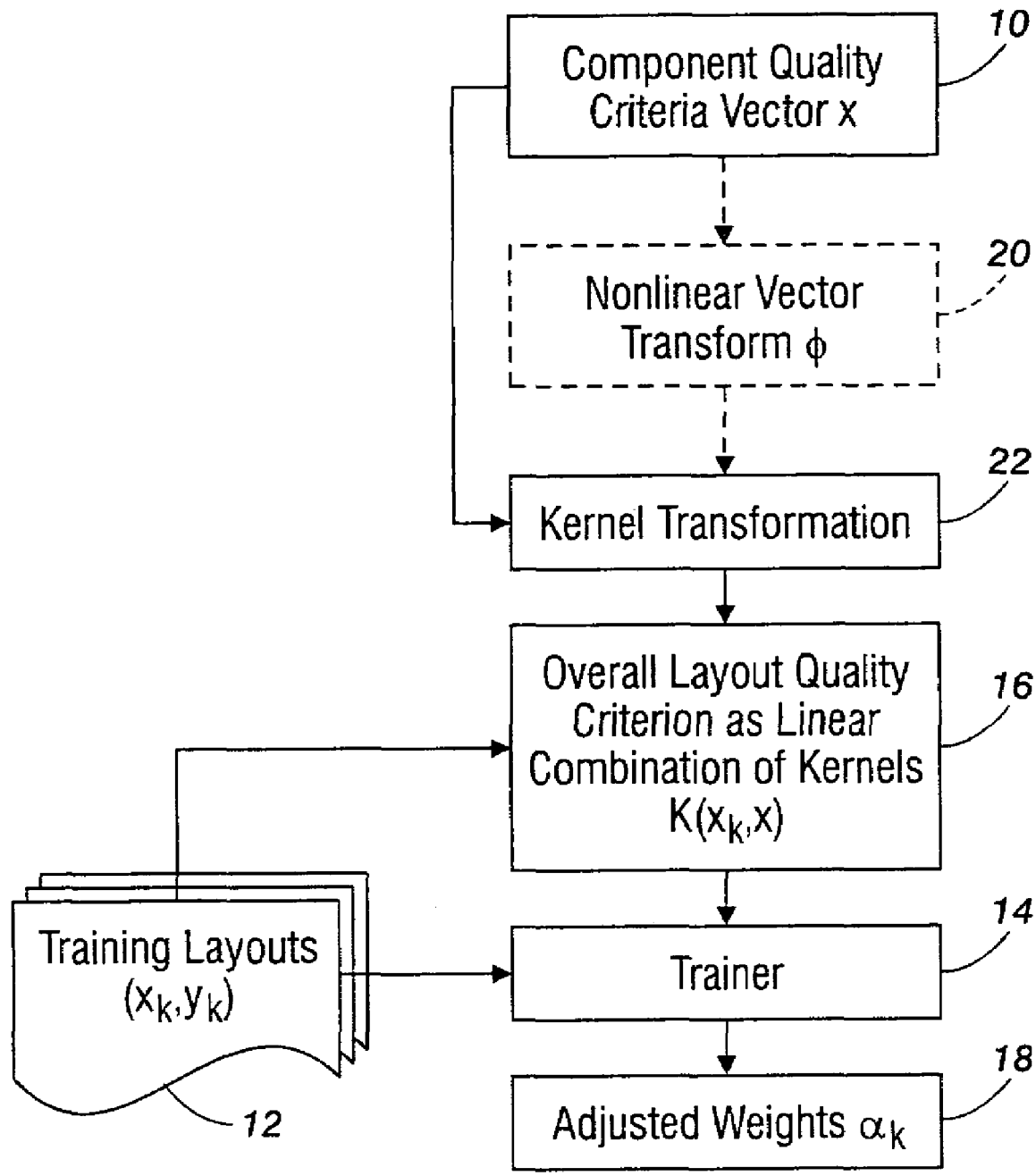
FIG. 1 diagrammatically shows an example apparatus for constructing and training an overall layout quality criterion combining a set of component quality criteria as a weighted linear combination of kernels.

With reference to FIG. 1, a set of component quality criteria are arranged in the form of a component quality criteria vector x 10. The component quality criteria may include substantially any suitable measure or indication of an aspect related to layout quality. Some example component quality criteria optionally incorporated into the component quality criteria vector x 10 include: color harmony, alignment, balance, uniformity, contrast, navigability, cost, white space (for example, measured as a percentage of the total page zone), or so forth. The component quality criteria optionally also include features describing a layout at a lower level, such as positions of bounding boxes of page zones, absolute color values, font sizes (optionally broken down into header font size, body text font size, title font size, etc.), or so forth. The number of component quality criteria can be large, such as numbering in the dozens or even hundreds of different component quality criteria. The elements of the component quality criteria vector x 10 represent values of selected component quality criteria.

It will be appreciated that some of these component quality criteria are interdependent, so that determining an overall best layout calls for making certain trade-offs. For example, increased font size may be good (makes text more readable) but increasing font size may increase ink or toner usage, may reduce the amount of white space and/or increase the number of pages, and so forth. For a set of component quality criteria which may number as high as dozens or hundreds of component quality criteria, the number of criteria interdependencies and resultant trade-offs can become large. Moreover, some of the component quality criteria and their trade-offs can be subjective in nature. For example, having a substantial amount of white space in a layout is usually considered to be good; having too little white space can make the layout appear cluttered or busy. However, just how much white space is "good" or how little white space is "bad" is typically a subjective judgment suitably made by a human evaluator. Similarly, in trading off font size versus white space (enhanced by using smaller fonts) the optimal trade-off is again typically a subjective human judgment.

It will also be appreciated that different component quality criteria that is, different elements of the component quality criteria vector x 10, may be quantified or represented using different and possibly incompatible metrics or formats. For example, ink usage criteria may be measured or represented by milligrams of ink used, while font size may be represented by an integer ranging from 8-72. Such metrical or representational incompatibilities amongst the component quality criteria further complicates analysis of the trade-offs involved in selecting or proofing candidate layouts.

For given selected content, the number of candidate layouts may be large, or it may be as low as a single candidate layout which is to be validated or proofed prior to publication. To perform layout selection, validation, or proofing, the various component quality criteria should be considered in view of their interdependencies and resultant trade-offs involved amongst various combinations of different component quality criteria. Ultimately, however, a final layout is selected which is used for publishing the content. As used herein, the term "publishing" is intended to encompass any method of disseminating content, such as by creating a printed document in accordance with the selected layout, creating a webpage in accordance with the selected layout, creating an email containing the content in the selected layout, or so forth.

Since a single final layout is typically to be selected, it is useful to have an overall layout quality criterion that embodies the component quality criteria and trade-offs therebetween. It can be advantageous for the value output by the overall layout quality criterion to be a scalar value that enables straightforward comparison of the overall layout quality of various candidate layouts, or enables a threshold decision as to whether a layout undergoing validation is satisfactory, or so forth. Additionally, in view of the subjective nature of the overall quality determination, it is advantageous to derive the overall layout quality criterion from a set of training layouts 12, each of which has been evaluated respective to the various component quality criteria and each of which has further had an overall layout quality label assigned thereto. In view of the subjective nature of the overall layout quality assessment, the overall layout quality label is typically assigned by one or more human beings, such as by an individual, a panel of human layout evaluators, a brand identity team of human evaluators, or so forth.

In summary, the overall layout quality criterion should advantageously: (i) provide a scalar value or other convenient metric for comparing or assessing overall layout quality; (ii) incorporate the component quality criteria even when those component quality criteria employ different formats or metrics; (iii) incorporate the various trade-offs between component quality criteria; and (iv) accord with subject human assessments of overall layout quality of training layouts of the set of training layouts 12. Additionally, the overall layout quality criterion should advantageously be: (v) derived from the set of training layouts 12, and (v) easily applied based on a set of input component criteria values so as to facilitate rapid comparison or proofing or validation of candidate layouts.

To enable deriving the overall layout criterion from the set of training layouts 12, a machine learning component or trainer 14 advantageously trains a weighted overall layout quality criterion 16 that combines the set of component quality criteria embodied by the component quality criteria vector x 10. The trainer 14 adjusts the weights of the weighted overall layout quality criterion 16 to produce a set of adjusted weights 18 such that when the adjusted weighted overall layout quality criterion 16, 18 receives the component quality criteria of one of the training layouts 12, it outputs an overall layout quality criterion value that substantially corresponds to the label of the input training layout that was assigned by the human or group, panel, team, or other plurality of humans.

The weighted overall layout quality criterion 16 can take various forms. For example, in some embodiments the weighted overall quality criterion is a weighted linear combination of the component quality criteria:

$$V(x) = \sum_i w_i \cdot T_i(x_i), \quad (1)$$

where x is the component quality criterion vector for an input layout, $x_i$ denotes elements of the vector x indexed by i, $w_i$ are corresponding weights, and $T_i$ is a suitable transform mapping the component quality criterion element $x_i$ to an appropriate metric or representational format. The weighted linear combination overall layout quality criterion of Equation (1) is suitably trained respective to the training layouts 12 to determine adjusted weights $w_i$ that ensure that Equation (1) yields a value substantially corresponding to a training layout label when the component quality criterion vector of that training layout is input to Equation (1).

However, the overall layout quality criterion of Equation (1) has certain disadvantages. For example, it does not readily embody certain non-linear trade-offs between component quality criteria. For example, an exclusive-or of two properties is not readily formulated using Equation (1). Trade-offs are subjective, and are most readily represented by those training layouts in which the trade-offs are made. For example, a training layout having a good trade-off between font size and white space may have an overall layout quality label indicating a good layout, and yet have relatively poor values for the component quality criteria of font size and white space. It is only by considering the training layout as a whole that one appreciates that the trade-off justifies a good overall layout quality assessment. When training the weighted linear combination overall quality criterion of Equation (1) which does not effectively recognize the trade-off, the result may simply be a reduced importance of the font size and white space component criteria through small trained values for the corresponding weights $w_i$. Such a trained weighted linear combination overall quality criterion will not effectively predict the overall layout quality assessment that a human would likely assign to a layout similar to the training layout that has the good trade-off between font size and white space.

In the illustrated embodiment, the overall layout quality criterion 16 is a weighted linear combination of kernels, in which each kernel corresponds to an inner product comparing component quality criteria values of a training layout with corresponding component quality criteria values of an input layout. Each kernel corresponds to a training layout, and the value of that kernel responsive to an input layout is indicative of similarity between the input layout and the corresponding training layout. The weight associated with each kernel indicates whether similarity of the input layout with the corresponding training layout is good (because the similar training layout was labeled as "good") or bad (because the similar training layout was labeled as "bad"). The trainer 14 trains the kernel-based overall layout quality criterion 16 by determining adjusted weights 18 that cause the output of the adjusted overall layout quality criterion 16, 18 to indicate a good overall layout when the input layout is similar to training layouts that have been labeled as good layouts, and to indicate a bad overall layout when the input layout is similar to training layouts that have been labeled as bad.

With continuing reference to FIG. 1, each training layout of the set of training layouts 12 is denoted by an index k. If N training layouts are provided, then the training layouts are suitably indexed by values k=0 to k=N−1, for example, or are suitably indexed by values k=1 to k=N, or so forth. Each training layout k is characterized by a vector of component quality criteria values $x_k$ having the form of the component quality criteria vector x 10. The vector of component quality criteria values $x_k$ is transformed by a non-linear vector transform φ20. Some suitable non-linear vector transforms φ are set forth, for example, in Cristianini et al., "An Introduction to Support Vector Machines" (Cambridge University Press, UK, 2000).

A kernel transform 22 computes kernels $K(x_k,x)$ defined as $K(x_k,x)=<\phi(x_k), \phi(x)>$ where the notation $<\phi(x_k), \phi(x)>$ denotes an inner product between vector $\phi(x_k)$ representing a transform of the component quality criteria values for training layout k and $\phi(x)$ representing a transform of the component quality criteria values for a candidate layout or other layout of interest. Each kernel $K(x_k,x)=<\phi(x_k), \phi(x)>$ provides a scalar value indicative of similarity between the values of the component criteria vector $x_k$ for the training layout k and the values of the component criteria vector x for the candidate layout. Conceptually, the kernel can be considered to represent the tradeoffs between component quality criteria made in the corresponding training layout, since similarity between a training layout which makes certain trade-offs and the input layout suggests that the input layout may make similar trade-offs.

Typically, $\phi(x_k) \neq x_k$, and the non-linear vector transform φ is selected to ensure that the inner product $<\phi(x_k), \phi(x)>$ corresponds to a scalar value indicative of similarity between the values of the component criteria vector $x_k$ for the training layout k and the values of the component criteria vector x for the candidate layout. In some embodiments, it is contemplated to have $\phi(x_k)=x_k$, in which case the non-linear vector transform φ is of no effect and is optionally omitted.

Although the kernels K correspond to inner product combinations of the vector transform mappings $\phi(x_k)$ and $\phi(x)$, in some embodiments the kernel transformation 22 is suitably implemented without expressly computing the mappings $\phi(x_k)$ and $\phi(x)$. For example, the kernel transformation $K(x_k, x)=\exp(-\|x_k-x\|^2)$ corresponds to an inner product of the form $<\phi(x_k), \phi(x)>$. However, the kernel transformation $K(x_k,x)=\exp(-\|x_k-x\|^2)$ can be implemented directly, whereas implementation through intermediate computation of the vector transform mappings $\phi(x_k)$ and $\phi(x)$ would require an infinite dimensional vector transform mapping φ. This optional avoidance of computing the vector transform mappings $\phi(x_k)$ and $\phi(x)$ is an advantage over other overall layout quality criterion formats such as the example of Equation (1), for which the transforms $T_i$ are expressly computed in developing the overall layout quality criterion. The optional avoidance of computing the vector transform mapping φ is diagrammatically indicated in FIG. 1 by showing the non-linear vector transform φ20 using dashed lines and by including the indicated direct input of the component quality criteria vector x 10 into the kernel transformation 22.

In example FIG. 1, the overall layout quality criterion 16 is defined as a linear combination of the kernels K corresponding to the training layouts 12, that is:

$$V(x) = \sum_k \alpha_k K(x_k, x), \quad (2)$$

where the values $\alpha_k$ are scalar weights. In some embodiments, the scalar weights $\alpha_k$ correspond to Lagrange multipliers, and are optionally selected to satisfy side conditions typical of kernel methods as described for example in Cristianini et al., "An Introduction to Support Vector Machines" (Cambridge University Press, UK, 2000). In other embodiments, the scalar weights $\alpha_k$ are not Lagrange multipliers.

Each training layout k is characterized by the corresponding component quality criteria vector $x_k$, and is also characterized by a scalar label $y_k$. The scalar label $y_k$ is indicative of a human quality judgment of how good the training layout denoted by k is (that is, $y_k$ is an indication of a subjective judgment of the overall quality of the training layout denoted k). In some embodiments, "how good" the layout is corresponds to whether the layout falls within a selected classification, such as being classifiable as an advertisement layout. The labels $y_k$ can take various forms. In some embodiments, the labels $y_k$ are absolute ranking values, such as $y_k$ taking a value between 1 and 4 where 1 denotes a layout judged as "most good" while 4 denotes a layout judged as "most bad". In other embodiments, the labels $y_k$ are relative ranking values, such as for N training layouts having $y_k$ values ranging from 1 to N where 1 indicates the best layout amongst the N training layouts and N indicates the worst layout amongst the N training layouts. In other embodiments, the labels $y_k$ indicate monetary measures. For example, if the training layouts are previously used fund-raising letters, then the labels $y_k$ may indicate the average amount of money received per letter sent out. In other embodiments, the labels $y_k$ may indicate binary quality thresholding, such as $y_k=1$ indicating the training layout is acceptable and $y_k=-1$ indicating the training layout is unacceptable. In other embodiments, the labels $y_k$ may indicate a classification of layout. For example, $y_k=1$ may indicate a layout used by the marketing department, $y_k=2$ may indicate a layout used by the engineering department, and so forth. However, this approach makes layouts mutually exclusive—that is, a layout belongs to either the marketing department or the engineering department. In other approaches, different overall quality combinations are constructed for each classification—for example, one overall quality combination for marketing, another overall quality combination for engineering, and so forth. In this approach, the same document may qualify for both marketing and engineering department classifications, for example.

In some embodiments, not all of the training layouts 12 are labeled. For example, learning approaches such as transduction or semi-supervised inference can be applied. See Goutte et al., "Combining labelled and unlabelled data: a case study on Fisher kernels and transductive inference for biological entity recognition," Proceedings of CoNLL-2002 for some examples of such learning approaches.

The overall quality criterion V(x) 16 of Equation (1) is trained by selecting or adjusting values for the scalar weights $\alpha_k$ such that $V(x=x_k) \approx y_k$. That is, the scalar weights $\alpha_k$ are adjusted such that the outputs of the overall quality criterion V(x) 16 using the adjusted scalar weights $\alpha_k$ 18 substantially corresponds to the labels $y_k$ for the training layouts denoted by index k. Such training can employ classifier training techniques, linear or non-linear regression analysis, support vector machines (SVM's), or so forth. Once trained, the output of the trained overall quality criterion V(x) 16, 18 for an unlabeled candidate layout x should typically be predictive of the overall layout quality label that a human would subjectively assign to the candidate layout x.

Figure 2:
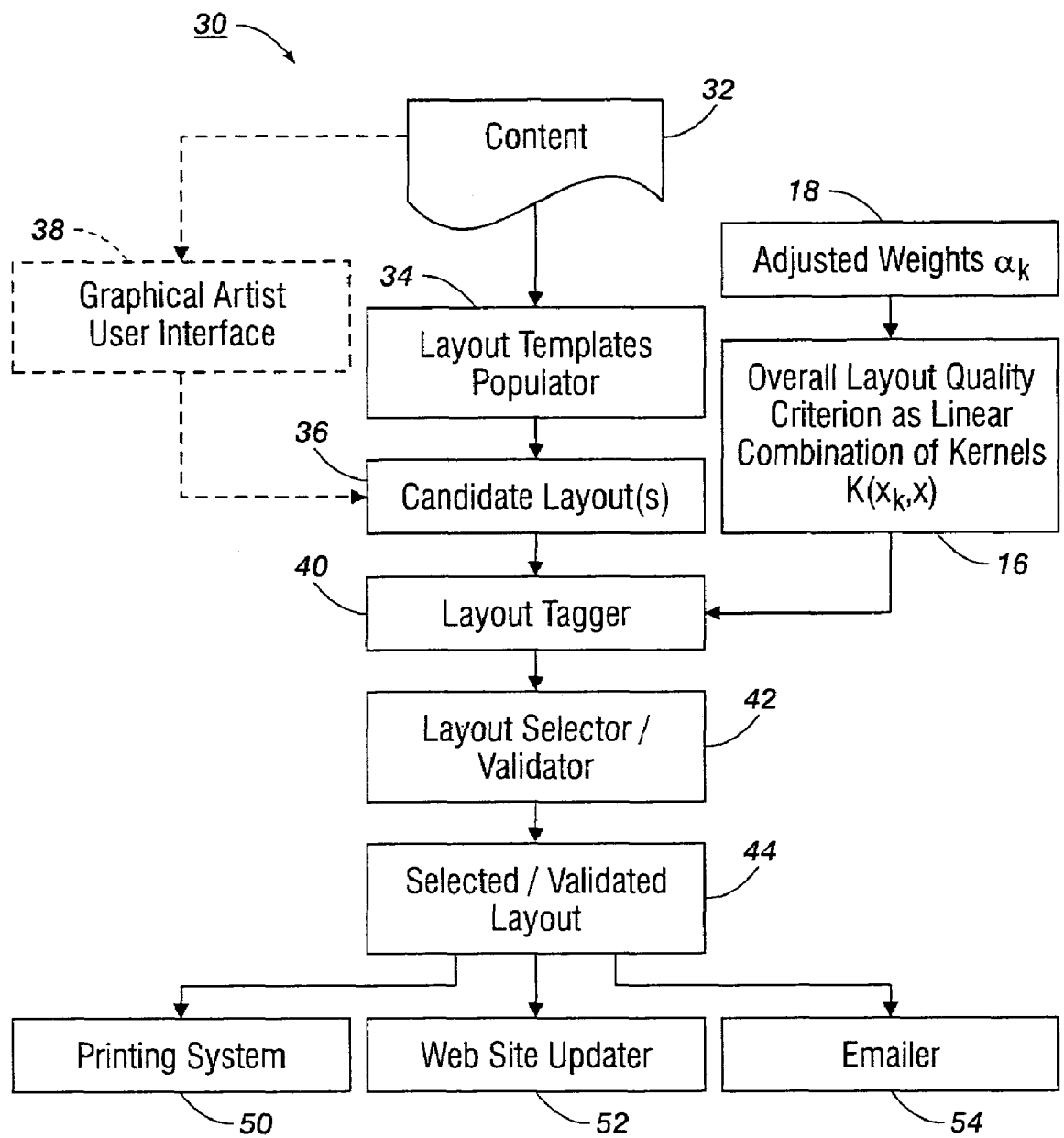
FIG. 2 diagrammatically shows an example apparatus for applying the kernel-based overall layout quality criterion of FIG. 1 to document layout selection or validation.

With reference to FIG. 2, an example document publishing system 30 is described, which selects or validates a layout for publishing a selected content 32. The content 32 may include text, images, figures, tables, equations, logos, or so forth. In an automatic document layout approach, a layout templates populator 34 populates a plurality of layout templates with the content 32 to create candidate layouts 36. In an alternative embodiment (indicated in FIG. 2 by being drawn using dashed lines), a human graphic artist generates the one or more candidate layouts 36 via a graphical artist user interface 38, optionally with reference to one or more layout templates. Various intermediate or semi-automated candidate layout generation approaches can be used that are intermediate between the automated and the manual approaches.

A layout tagger 40 tags each of the one or more candidate layouts 36 with an overall layout quality criterion value using the adjusted overall layout quality criterion 16, 18 as set forth in Equation (2), where x is the component quality criteria vector representing the component quality criteria values of the input candidate layout. A layout selector or validator 42 selects a selected or validated layout 44 from amongst the candidate layouts 36 based on the tagging. The selected or validated layout 44 is published. Various publishers 50, 52, 54 can be used for the publishing, such as: (i) a printing system 50 that prints the selected layout 44 including the content 32; (ii) a website updater 52 that updates a website with the selected or validated layout 44 including the content 32; (iii) an emailer 54 that constructs an email including the validated layout 44 including the content 32 and emails the constructed email to a distribution list of recipients; or so forth. Publication can be by a selected one of the publishers 50, 52, 54, by a combination of publishers (such as for example being published both in hardcopy by the printing system 50 and on the Internet by the website updater 52), or by another suitable publisher other than the illustrated example publishers 50, 52, 54, such as a newsgroup posting service, local area network, or so forth.

If only a single candidate layout is provided (for example, a single candidate layout generated by the human graphical artist via the user interface 38) then the layout selector or validator 42 suitably validates or proofs the candidate layout 36 by making a threshold decision as to whether the layout is satisfactory based on the tagged overall layout quality criterion value. The candidate layout is then published by the publisher 50, 52, 54 conditional upon the layout selector or validator 42 validating the constructed candidate layout. If the candidate layout is rejected by the layout selector or validator 42, then the graphical artist can modify or replace the layout via the user interface 38 until a validated layout is obtained.

In an actually constructed implementation of the document layout techniques disclosed herein, 160 layouts were created and were evaluated by a panel of four people on a scale of: 1=good; 2=acceptable; 3=unacceptable; and 4=awful. The component quality criteria vector 10 included 38 component quality criteria, and support vector machines (SVM's) were used as the trainer 14 for ordinal regression with multiple layouts of identical content of travel brochures. In this actually constructed implementation, the kernel $K(x_k,x)=<\phi(x_k),$ $\phi(x)>$ was used with $\phi(x_k)=\log(\max\{x_k-\tau_k; \epsilon\})$ and $\phi(x)=\log(\max\{x-\tau_k, \epsilon\})$, where $\tau_k$ was a manually selected value at which a particular quality attribute became unambiguously unacceptable.

The example document publishing system 30 can be physically implemented in various ways. In some embodiments, a printing shop includes a computer workstation embodying the user interface 38 and/or layout templates populator 34 and processing components 40, 42, and various printing systems 50. In some embodiments, the user interface 38 and/or layout templates populator 34 are embodied by a user terminal connected with a local area network, wireless network, or other digital network, the processing components 40, 42 are embodied by a computer of the user terminal and/or another computer on the digital network, and the publisher 50, 52, 54 includes a printer connected with the digital network, a website updater component of the digital network in communication with the Internet, an email server and associated components, or so forth. In some embodiments, the document publishing system incorporates the trainer 14 so that the overall layout quality criterion can be constructed and occasionally re-trained to keep the overall layout quality criterion up-to-date. In other embodiments, the document publishing system is supplied with the adjusted overall layout quality criterion 16 including the adjusted weights 18. For example, in a publishing enterprise including a central office and various geographically distributed satellite publication sites, the overall layout quality criterion 16 including the adjusted weights 18 may be generated at the central office and then communicated to the satellite publication sites by a digital network, via a portable storage medium such as an optical disk, or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document layout system comprising:
   a candidate layout generator that constructs a plurality of candidate layouts for selected content;
   a layout quality tagger that tags the candidate layouts with overall layout quality criterion values using an overall layout quality criterion combining a set of component quality criteria as a weighted linear combination of kernels, each kernel corresponding to an inner product $<\phi(x_k), \phi(x)>$ comparing component quality criteria values of a training layout with corresponding component quality criteria values of an input layout where $x_k$ denotes a vector representing the component quality criteria values for training layout k, x denotes a vector representing the component quality criteria values for the input layout, and $\phi$ denotes a non-linear vector transform selected to ensure that the inner product $<\phi(x_k), \phi(x)>$ corresponds to a scalar value indicative of similarity between the values of the component criteria vector $x_k$ for the training layout k and the values of the component criteria vector x for the candidate layout.;
   a layout selector that selects a layout for the selected content from amongst the candidate layouts based on the tagged overall layout quality criterion values; and
   a trainer for training the overall layout quality criterion using the training layouts, the training adjusting weights of the weighted linear combination of kernels such that for an input training layout the overall layout quality criterion outputs a value substantially corresponding to a label assigned to the input training layout;
   wherein the candidate layout generator, layout quality tagger, and trainer are embodied by a computer.

2. The document layout system as set forth in claim 1, wherein the subjective labels are selected from a group consisting of (i) absolute ranking values indicative of layout quality, (ii) relative ranking values indicative of relative layout quality amongst the training layouts, (iii) binary threshold values indicative of layout acceptability, (iv) monetary measures of layout quality, and (v) layout classifications.

3. A document layout system comprising:
   a computer embodying:
      a candidate layout generator that constructs a plurality of candidate layouts for selected content;
      a layout quality tagger that tags the candidate layouts with overall layout quality criterion values using an overall layout quality criterion combining a set of component quality criteria as a weighted linear combination of kernels, each kernel corresponding to an inner product comparing component quality criteria values of a training layout with corresponding component quality criteria values of an input layout, the kernels corresponding to inner products between a first vector $\phi(x_k)$ and a second vector $\phi(x)$ where $x_k$ denotes a vector representing the component quality criteria values for training layout k, x denotes a vector representing the component quality criteria values for the input layout, and $\phi$ denotes a non-linear vector transform; and
      a layout selector that selects a layout for the selected content from amongst the candidate layouts based on the tagged overall layout quality criterion values.

4. The document layout system as set forth in claim 3, wherein the set of component quality criteria include criteria selected from a group consisting of: color harmony, alignment, balance, uniformity, contrast, navigability, cost, white space, positions of bounding boxes of page zones, absolute color values, font size, header font size, body text font size, and title font size.

5. The document layout system as set forth in claim 3, wherein $\phi(x_k)=\log(\max\{x_k-\tau_k, \epsilon\})$ and $\phi(x)=\log(\max\{x-\tau_k, \epsilon\})$ where $\tau_k$ denotes an unacceptability threshold value and is minimum mapped value.

6. The document layout system as set forth in claim 3, wherein the candidate layout generator comprises:
   a layout template populator that populates layout templates with the selected content.

7. The document layout system as set forth in claim 3, wherein the candidate layout generator comprises:
   a user interface by which an associated user constructs candidate layouts.

8. A document publishing system comprising:
   a layout quality tagger for tagging candidate layouts of selected content with overall layout quality criterion values using an overall layout quality criterion combining a set of component quality criteria as a weighted linear combination of kernels, each kernel corresponding to an inner product $<\phi(x_k), \phi(x)<$ comparing component quality criteria values of a training layout with corresponding component quality criteria values of an input layout where $\phi(x_k)$ denotes a vector representing the component quality criteria values for training layout k and $\phi(x)$ denotes a vector representing the component quality criteria values for the input layout;

a layout selector that validates a layout for the selected content based at least on the tagged overall layout quality criterion value of the layout;

a publisher for publishing the validated layout including the selected content; and a trainer for selecting the weights of the weighted linear combination of kernels such that responsive to the input layout being one of the training layouts the overall layout quality criterion outputs a value substantially corresponding to a label assigned to the input training layout;

wherein at least the trainer, the layout quality tagger, and the layout selector are embodied by a computer.

9. The document publishing system as set forth in claim 8, wherein the publisher is selected from a group consisting of (i) a printing system that prints the validated layout, (ii) a website updater that updates a website with the validated layout, and (iii) an emailer that constructs an email including the validated layout.

10. A document publishing system comprising:

a computer embodying:

a layout quality tagger for tagging candidate layouts of selected content with overall layout quality criterion values using an overall layout quality criterion combining a set of component quality criteria as a weighted linear combination of kernels, each kernel corresponding to an inner product comparing component quality criteria values of a training layout with corresponding component quality criteria values of an input layout, each kernel corresponding to an inner product between (i) a vector derived from the component quality criteria values for the corresponding training layout and (ii) a vector derived from the component quality criteria values for the input layout, and a layout selector that validates a layout for the selected content based at least on the tagged overall layout quality criterion value of the layout; and a publisher for publishing the validated layout including the selected content.

11. The document publishing system as set forth in claim 10, further comprising:

a layout template populater that populates layout templates with the selected content to generate a plurality of candidate layouts, the layout selector selecting the validated layout from amongst the plurality of candidate layouts.

12. The document publishing system as set forth in claim 10, further comprising:

a user interface by which an associated user constructs a candidate layout, the candidate layout being published by the publisher conditional upon the layout selector validating the constructed candidate layout.

13. The document publishing system as set forth in claim 10, wherein the publisher is selected from a group consisting of (i) a printing system that prints the validated layout, (ii) a website updater that updates a website with the validated layout, and (iii) an emailer that constructs an email including the validated layout.

14. A document layout method comprising:

constructing one or more candidate layouts for selected content;

tagging the candidate layouts with overall layout quality criterion values computed using a weighted overall layout quality criterion combining a set of component quality criteria, wherein the overall layout quality criterion comprises a weighted linear combination of a plurality of inner products each inner product being between (i) a vector derived from component quality criteria values of one of the set of training layouts and (ii) a vector derived from component quality criteria values of the layout being tagged;

adjusting weights of the overall layout quality criterion respective to a set of labeled training layouts such that the layout quality tagger is configured to tag the labeled training layouts with overall layout quality criterion values substantially corresponding to the labels of the labeled training layouts; and selecting a layout for the selected content from amongst the one or more candidate layouts based on the corresponding tagged overall layout quality criterion values;

wherein at least the adjusting and the selecting are performed by a computer.

15. The document layout method as set forth in claim 14, wherein each inner product of the overall layout quality criterion is indicative of similarity between component quality criteria values of a corresponding training layout and component quality criteria values of the layout being tagged.

16. The document layout method as set forth in claim 14, wherein the constructing is selected from a group consisting of (i) populating layout templates with the selected content to generate a plurality of candidate layouts, and (ii) providing a user interface by which an associated user constructs a candidate layout, the candidate layout being selected by the selecting operation conditional upon the corresponding tagged overall layout quality criterion value satisfying a predetermined selection criterion.

\* \* \* \* \*